United States Patent [19]

Whitehead, Jr.

[11] 4,072,058

[45] Feb. 7, 1978

[54] DIFFERENTIAL PRESSURE TRANSMITTER WITH PRESSURE SENSOR PROTECTION

[75] Inventor: Robert C. Whitehead, Jr., Oreland, Pa.

[73] Assignee: Honeywell Inc., Minneapolis, Minn.

[21] Appl. No.: 682,280

[22] Filed: May 3, 1976

[51] Int. Cl.² .................................................. G01L 7/08
[52] U.S. Cl. ............................................................ 73/720
[58] Field of Search .............. 73/398 AR, 407 R, 392, 73/393, 395; 338/4, 42

[56] References Cited

U.S. PATENT DOCUMENTS

| | | | |
|---|---|---|---|
| 2,037,949 | 4/1936 | Gate | 73/393 X |
| 2,906,095 | 9/1959 | Whitehead, Jr. | 73/393 X |
| 3,277,719 | 10/1966 | Prell | 73/407 R |
| 3,400,588 | 9/1968 | O'Connor | 73/407 R |
| 3,559,488 | 2/1971 | Weaver | 73/407 R |
| 3,590,641 | 7/1971 | Eggleston | 73/395 X |
| 3,618,390 | 11/1971 | Frick | 73/407 R |
| 3,712,143 | 1/1973 | Weaver et al. | 73/407 R |
| 3,722,373 | 3/1973 | Beach et al. | 73/407 R |
| 3,780,588 | 12/1973 | Whitehead, Jr. et al. | 73/407 R |
| 3,853,007 | 12/1974 | Jaquith | 73/395 |
| 3,999,435 | 12/1976 | Siegel | 73/393 |

*Primary Examiner*—Daniel M. Yasich

*Attorney, Agent, or Firm*—Laurence J. Marhoefer; Lockwood D. Burton; George E. Bodenstein

[57] ABSTRACT

A differential pressure to electrical signal transmitter has a pair of barrier diaphragms and one or two central control diaphragms located between the barrier diaphragms. A chamber on the outside of one barrier diaphragm is pressurized with a first fluid, and a chamber on the outside of the other barrier diaphragm is pressurized with a second fluid. First chambers between one of the barrier diaphragms and the control diaphragm, and a first length of capillary tubing connected between the first chambers and one chamber of a remotely located sensor capsule, are filled with a first incompressible fill liquid. Second chambers between the other barrier diaphragm and the control diaphragm, and a second length of capillary tubing connected between the second chambers and another chamber of the sensor capsule, are filled with a second incompressible fill liquid. The pressures of the two fill liquids act on the opposite sides of a minute displacement sensing element, located between the two sensor chambers, to displace the element and cause it to produce an electrical output signal which is dependent upon the difference between the fill liquid pressures, and hence upon the difference between the pressures of the first and second fluids.

5 Claims, 10 Drawing Figures

DIFFERENTIAL PRESSURE TRANSMITTER WITH PRESSURE SENSOR PROTECTION

CROSS REFERENCE TO RELATED APPLICATION

Subject matter shown and described but not claimed herein is shown, described, and claimed in a copending application of William F. Newbold and Lewis A. Medlar filed on even date herewith and bearing Ser. No. 682,316.

BACKGROUND OF THE INVENTION

1. Field of the Invention

The present invention relates generally to pressure to electrical signal transducers or transmitters, and relates specifically to that type of such transmitters which employs a differential pressure sensor or sensing element to produce an electrical signal of a value dependent upon the difference between two fluid pressures. Transmitters of this type are referred to herein as differential pressure transmitters. More specifically, the invention relates to transmitters of this type which employ barrier diaphragms and fill fluids for transmitting fluid pressures to the sensor.

2. Description of the Prior Art

Differential pressure transmitters of the form last noted above are known in the art. An example of a first type of such a transmitter, employing a sensor which has only a minute displacement over its operating range, is shown in the Weaver et al U.S. Pat. No. 3,712,143. In the latter transmitter, the sensor is a semiconductor strain-sensitive wafer. An example of a second type of such a transmitter, employing a sensor having a relatively large displacement over its operating range, is shown in the Frick U.S. Pat. No. 3,618,390.

Differential pressure transmitters of the form shown in the above-noted patents include a so-called head structure which contains two barrier diaphragms. A chamber on one side of one diaphragm is pressurized with a fluid having a first pressure, and a chamber on one side of the other diaphragm is pressurized with a fluid having a second pressure. These two fluids, hereinafter referred to as applied fluids, may well be so-called process fluids which are on the two sides of an orifice plate in a process flow line.

A separate chamber on the other side of each of the diaphragms contains a fill fluid. These fill fluids communicate with the opposite sides of the sensor, and the latter is displaced or deflected by an amount which is dependent upon the difference between the two pressures of the fill fluids, and which is thus dependent upon the differential pressure of the two applied fluids. The sensor produces an electrical output signal which is dependent upon said displacement and hence upon said differential pressure. In all of such known transmitters with which I am familiar, the sensor is located within the head structure adjacent the barrier diaphragms.

Although the known transmitters, as just described, have provided the desired results in many applications, they have exhibited shortcomings in two areas. Thus, because of the minute full range displacement of the sensor in the transmitters of said first type, it has been necessary to equip such transmitters with overload protection arrangements to prevent the sensors from being excessively displaced, and hence degraded, damaged, or destroyed, by excessive applied fluid pressures. In the transmitter of the above-noted Weaver et al patent, such overload protection is provided by a bellows-actuated valve arrangement. Such an arrangement increases the size, complexity, and cost of the transmitter to an extent which is undesirable in certain cases.

In the transmitters of said second type, overload protection is more readily obtained, but the relatively large displacement sensors of those transmitters have been found to be less desirable than the minute displacement type of sensor employed in said first type of transmitter.

The other area in which the known transmitters have exhibited a shortcoming is that wherein there are applied fluids present on the outsides of the two barrier diaphragms which are at high temperatures and/or are subject to pulsations. It has been found that the barrier diaphragms and the fill fluids tend to transmit the applied fluid heat and/or pulsations to the sensor because of the latter's location within the head structure which is supporting the barrier diaphragms. The result is that the sensor is either rendered inaccurate or damaged.

Additionally, the location of the sensor in the head structure requires a fluid tight seal at the point where the electrical output leads from the sensor pass out through the wall of the head structure. Since such a seal must be capable of withstanding the heat of the process fluids, this seal requires the use of a relatively expensive material.

SUMMARY OF THE INVENTION

Accordingly, it is an object of the present invention to provide an improved differential pressure transmitter which avoids the above-noted shortcomings of the known transmitters. It is a specific object of the invention to provide an improved transmitter of the minute displacement sensor type which embodies a relatively simple and compact arrangement for preventing the sensor from being subjected to excessive pressures. Another specific object of the invention is to provide an improved transmitter wherein the transmission of heat and/or pulses from the head structure to the sensor is minimized.

To the end of accomplishing the above-noted and other desirable objects, an improved transmitter construction according to the present invention includes a central or control diaphragm means, across which are applied the two fluid pressures which are applied across the sensor. This control diaphragm means permits either of the barrier diaphragms to bottom-out on a mating surface in the presence of an excessive or overload pressure on the applied fluid side of that barrier diaphragm, thereby preventing such an excessive pressure from appearing across the sensor and degrading, damaging, or destroying the latter.

Also, in an improved transmitter construction in accordance with the present invention, the sensor is remotely located with respect to the transmitter head structure containing the barrier diaphragms, and is connected to the chambers of the latter by capillary tubes of such size and orientation as to minimize the transfer of sensor-damaging heat and/or pulses from the applied fluids and head structure to the sensor. This remote location of the sensor also avoids the need for the expensive lead seals noted above.

BRIEF DESCRIPTION OF THE DRAWINGS

A better understanding of the present invention may be had when the following detailed description is read in connection with the accompanying drawings, in which.

DETAILED DESCRIPTION OF THE PREFERRED EMBODIMENT

Figure 1:
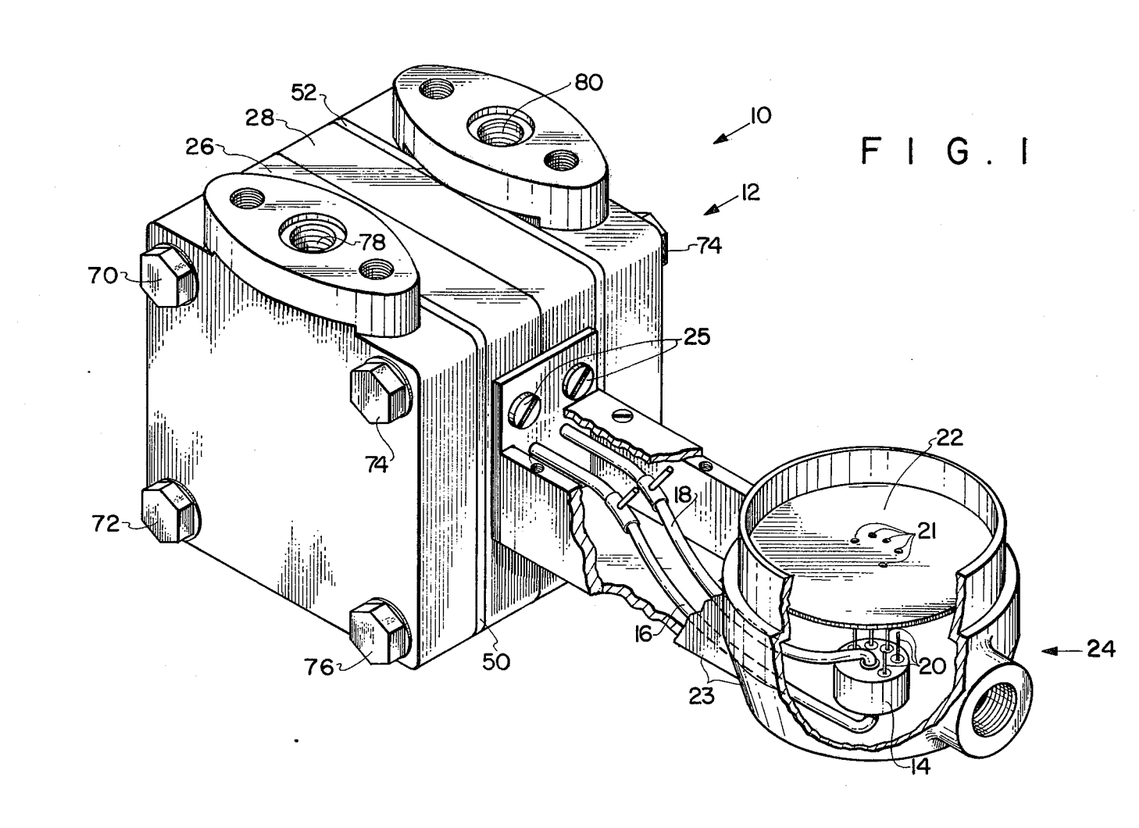
FIG. 1 is a perspective view of a pressure sensing head interconnected with a remote sensing capsule to form a differential pressure to electrical signal transmitter in accordance with the teaching of this invention.

Referring now to FIG. 1, there is shown a differential pressure to electrical signal or current transmitter 10 having a pressure sensing head, indicated by the general reference numeral 12, coupled to a remote sensor capsule 14 by a pair of capillary tubes 16, 18 that extend between the head 12 and the capsule 14. The capsule 14 and capillaries 16, 18 are covered by a trough 23 and a housing 24. Screws 25 secure the housing 24 and trough 23 on the sensing head 12.

Figure 2:
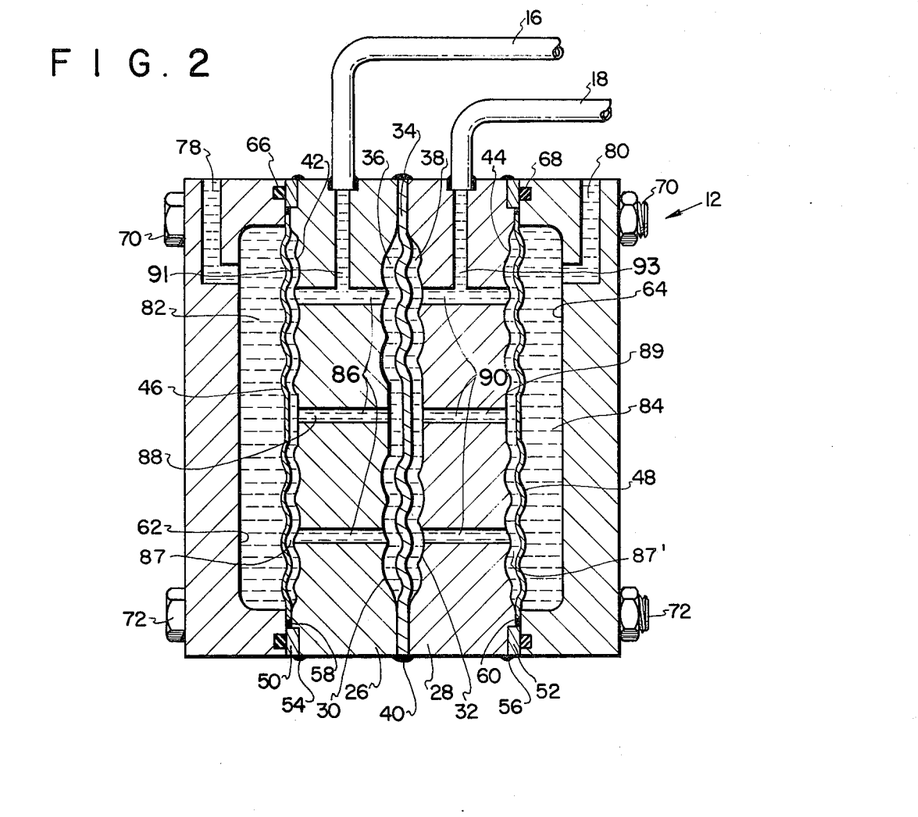
FIG. 2 is a schematic cross-section of a preferred form of the pressure sensing head shown in FIG. 1.

The sensor capsule 14 is connected by conductive pins 20 to electric sockets 21 on a printed circuit board 22. The sensing head 12 contains two identical blocks 26, 28 preferably made of stainless steel AISI type 316. As can be seen in FIG. 2, each block 26, 28 has an annular dished-out convoluted surface 30, 32, respectively. A convoluted flexible center or control diaphragm 34 extends between these blocks to form two separate chambers 36, 38. The convolutions formed in the diaphragm 34 are annular and follow the contour of annular convoluted surfaces formed on the inner face surfaces 30 and 32. The diaphragm 34 is preferably made of metal such as stainless steel AISI type 316. The outer periphery of the diaphragm 34 is clamped between mating flat surfaces on blocks 26, 28. Preferably, a fluid tight joint between the blocks 26, 28 and the diaphragm 34 is formed by welding these three components together around their entire peripheral surface by means of a tungsten inert gas weld 40, commonly referred to as a TIG weld.

The other side of each of the blocks 26, 28 has an annular convoluted surface 42, 44 also. A convoluted barrier diaphragm 46, which is preferably made of stainless steel AISI type 316, extends and is in spaced relationship with convoluted wall surface 42. Similarly, a convoluted stainless steel AISI type 316 diaphragm 48 extends along and is spaced from surface 44. Preferably, the diaphragms 46 and 48 are identical.

The outer periphery of each block 26, 28 is recessed, and square frame or ring members 50, 52 are respectively mounted therein. These members are made of stainless steel AISI type 316. The rings 50, 52 are TIG seam welded, as indicated by reference numerals 54, 56, to form a fluid tight joint. Barrier diaphragms 46, 48 are TIG seam welded, as indicated by reference numerals 58, 60, to their frame members 50, 52, respectively. These welds 58 and 60 are fluid tight.

Two dished-out head chambers 62, 64 are connected in fluid seal-tight relationship with their associated rings 50, 52 by means of suitable O-ring seals 66, 68 and with the aid of four bolt and nut connections 70, 72, 74, 76. These head chambers 62, 64 and bolt and nut connections 70, 72, 74, 76 are made of stainless steel AISI type 316. A separate inlet passageway 78, 80 is formed in each head chamber 62, 64. Respective high and low pressure process fluids 82, 84, whose differential pressure is to be measured, are applied by way of their respective passageways 78, 80 and chambers 62, 64. to barrier diaphragms 46, 48.

A plurality of passageways 86 interconnect the chamber 36 on the left side of the center diaphragm 34 with the space or chamber 87 between the barrier diaphragm 46 and the convoluted surface 42. A non-conductive, incompressible fill liquid 88 fills this entire region.

A plurality of passageways 90 interconnect the chamber 38 and the space or chamber 87¹ between the barrier diaphragm 48 and the convoluted surface 44. A non-conductive incompressible fill liquid 89 fills this entire region. Preferably, the characteristics of the two fill liquids are similar.

A pair of passageways 91 and 93 connect the capillary tubes 16 and 18, respectively, to the fill liquids 88 and 89.

Figure 3:
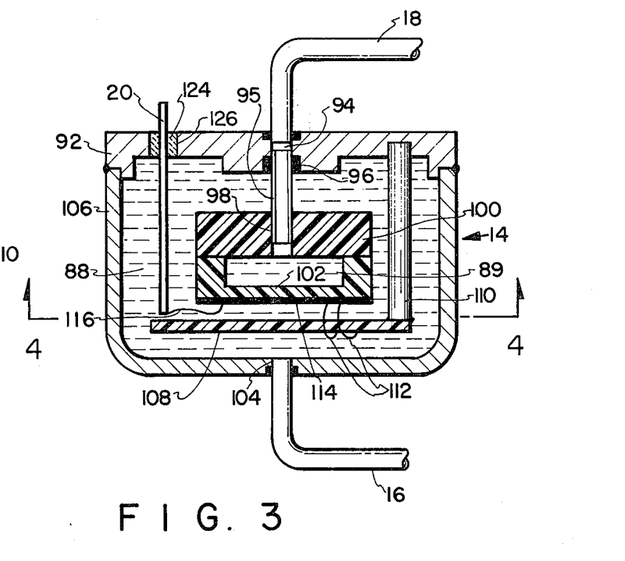
FIG. 3 is a cross-section of a preferred form of a differential pressure sensor in the remote capsule shown in FIG. 1.
Figure 4:
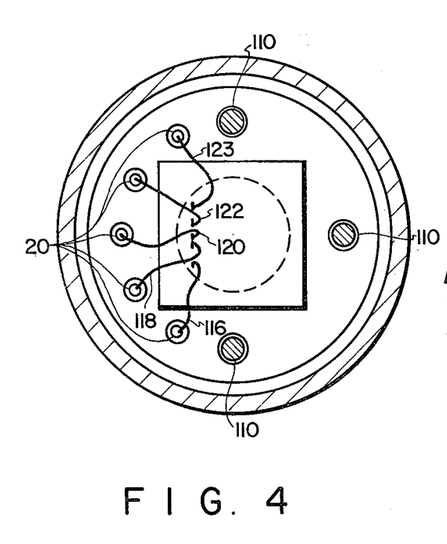
FIG. 4 is a bottom view of the capsule shown in FIG. 3 taken along the line 4—4 thereof.

Referring now to FIGS. 1 and 3, the low pressure capillary tube 18 is in fluid tight engagement with capsule 14, extending into a passageway 94 formed in a metal wall 92 of the capsule 14. A glass tube 95 extends between a position in the passageway 94, adjacent the end of the tube 18, and a position in a passageway 98 in a silicon support plate 100. The tube 95 is maintained in fluid tight engagement with the passageway 94 by an epoxy seal 96, and is maintained in fluid tight engagement with the passageway 98 by a suitable seal, such as that produced by the method disclosed in the Charnley et al U.S. Pat. No. 3,803,874.

The high pressure capillary tube 16 extends through, and is in fluid tight relationship with, an opening 104 in a cover plate 106 of the capsule 14.

A cup-shaped semiconductor wafer 102, such as a silicon wafer, is bonded to the support plate 100, preferably by means of a gold eutectic bonding technique known in the art. The previously referred to high pressure fill liquid 88 fills the high pressure capillary tube 16 and the interior space or sensor chamber of the capsule 14, applying a pressure to the outer surface or face of the wafer 102. The previously referred to low pressure fill liquid 89 fills the low pressure capillary tube 18, the tube 95, and the sensor chamber between the plate 100 and the wafer 102, and applies a pressure to the inner surface of the wafer 102. Thus, the fill liquids 88 and 89 are caused to act on the respective opposite portions or faces of the wafer 102.

An ion migration shield 108 is mounted adjacent the wafer 102 by a number of stand-offs or rods 110, and is electrically connected to the wafer 102 by a pair of conductors 112.

A wheatstone strain gauge bridge indicated by reference numeral 114 is diffused into the outer surface of the wafer 102. A suitable number of fine wires 116, 118, 120, 122, 123 extend between the bridge 114 and the pins 20. Glass seals 124 form fluid tight seals between the portions of the pins 20 passing through the wall 92 and openings 126 formed in the wall 92.

Figure 5:
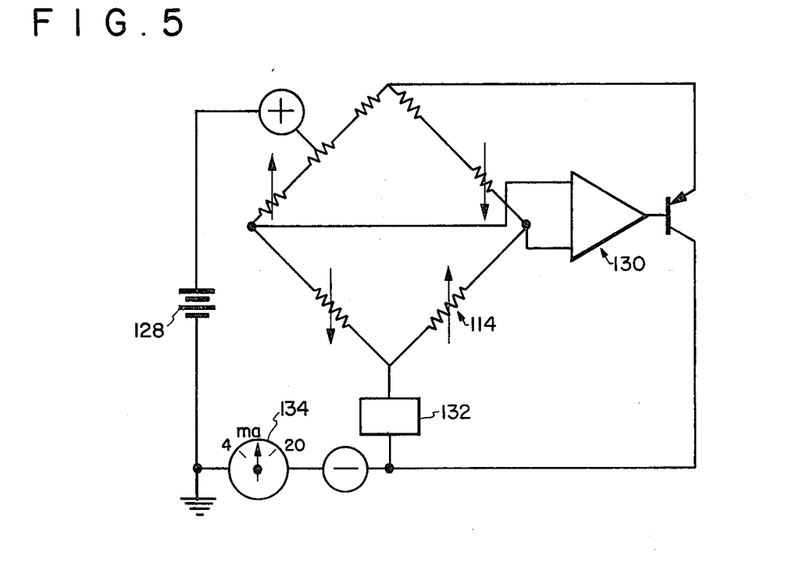
FIG. 5 is a schematic diagram of an electrical bridge circuit employed to produce an electrical signal that is responsive to the magnitude of the differential pressure under measurement.

FIG. 5 shows schematically one embodiment of the wheatstone bridge 114 that is diffused into the wafer 102. A temperature compensated amplifier unit 130 and a constant current regulator 132, associated with the bridge 114, are mounted externally to the capsule 14, preferably on the printed circuit board 22.

A detailed description of the amplifier unit 130, and how it is interrelated with the output of the strain gage bridge 114 to provide temperature compensation, appears in the Demark U.S. Pat. No. 3,654,545. An electric meter 134, powered by a battery 128, is connected to the bridge circuit 114 for indicating the magnitude of the differential pressure being applied across the wafer 102 in terms of electrical units, for example, 4 to 20 milliamps, which are equivalent to the operating range that is selected for the transmitter 10.

The wafer 102 and its diffused bridge 114 form a sensor of the above-noted minute displacement type. They thus experience only a minute displacement or deflection as the difference between the fluid pressures in the tubes 16 and 18 traverses its normal operating range. An excessive value of this pressure difference can well result in the degradation, damage, or destruction of the wafer 102 and its diffused bridge 114.

DETAILED DESCRIPTION OF MODIFICATIONS OF THE SENSING HEAD

Figure 6:
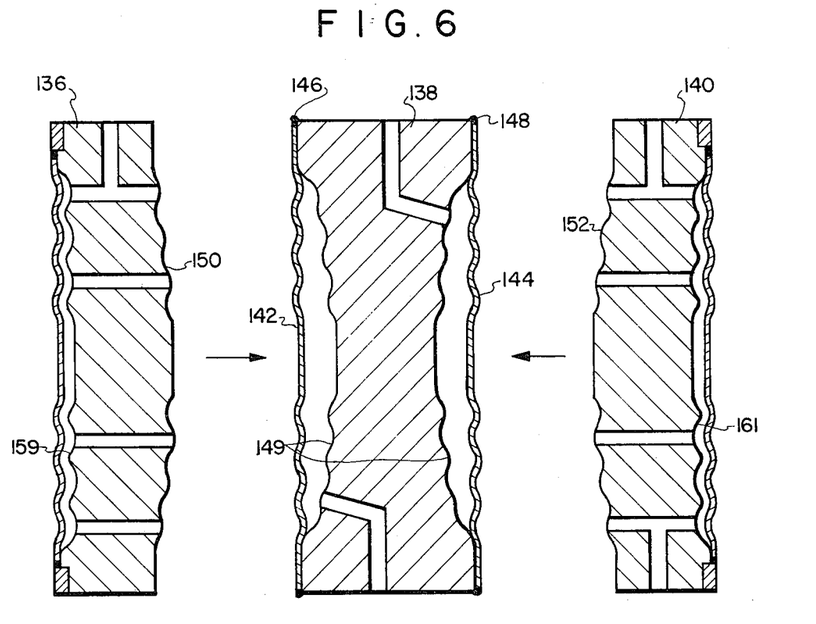
FIG. 6 is a sectional view of components of a modified form of the pressure sensing head prior to assembly.
Figure 7:
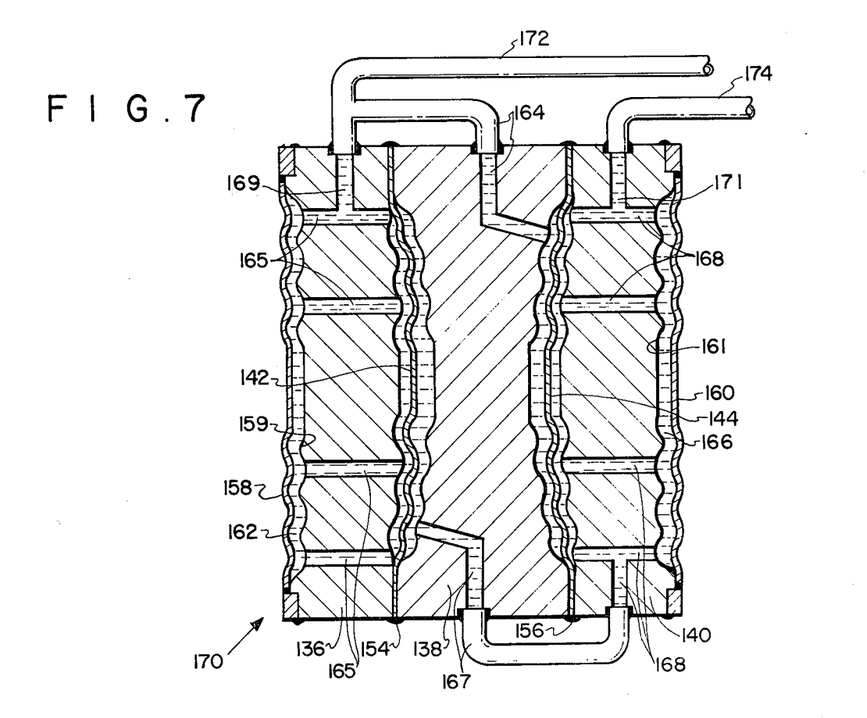
FIG. 7 shows the pressure sensing head parts of FIG. 6 in an assembled condition.

A modified form of the head 12 as shown in FIGS. 6 and 7 differs from the FIG. 2 construction in that the modified form employs three blocks 136, 138, 140, whereas the FIG. 2 embodiment employs only two blocks 26, 28. Another difference is that the center block 138 contains two center or control diaphragms 142, 144 in the place of the single diaphragm 34. Each of the diaphragms 142, 144 is connected in a partially tensioned or taut fluid tight sealed condition, by TIG welds 146, 148, to a different surface or side of the center block 138. The opposite sides of block 138 have annular convoluted concave surfaces 149 which follow and are spaced from the contour of associated annular convoluted surfaces formed in the center diaphragms 142, 144.

Blocks 136, 140 are constructed so that they can be moved toward one another, in the direction of the arrows shown in FIG. 6, so that their annular convoluted convex surfaces 150, 152 can be brought into compressed engagement with the associated taut diaphragms 142, 144.

FIG. 7 shows the blocks 136, 138, 140 of FIG. 6 joined together by fluid tight seam TIG welds 154, 156 after the center diaphragms 142, 144 have been compressed in the aforementioned manner into a preloaded condition.

The outer side walls of the blocks 136, 140 have annular convoluted surfaces 159, 161 covered by spaced, matching, annular convoluted barrier diaphragms 158, 160. The latter are attached to rings in a manner similar to that previously set forth in the description of FIG. 2.

A first non-conductive, non-compressible fill liquid 162 fills passageways 164, 165 and chambers that extend between the barrier diaphragm 158 and the left side of each of the center diaphragms 142, 144. Another similar fill liquid 166 fills passageways 167, 168 and chambers that extend between the barrier diaphragm 160 and the right side of each of the center diaphragms 142, 144. The block and diaphragm arrangement shown in FIG. 7 thus provides an integral or one piece welded pressure sensing head 170.

A dished-out chamber, not shown, is mounted on each of the opposite sides of the pressure head 170 to enable a high pressure process fluid to be applied to the barrier diaphragm 158 and a low pressure process fluid to be applied to the barrier diaphragm 160, in a manner similar to the arrangement of the head chambers 62, 64 as set forth under the description of FIG. 2.

A pair of passageways 169 and 171 connect the capillary tubes 172, 174, respectively, to the fill liquids 162, 166 in blocks 136, 140.

Capillary tubes 172, 174, each containing a separate one of the fill liquids 162, 166, are provided for transmitting pressure changes in these fill fluids to a remote sensor capsule 14 as shown in FIG. 1.

Figure 8:
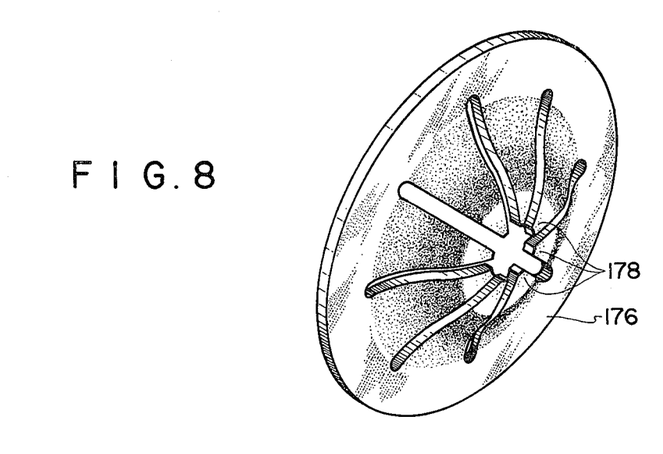
FIG. 8 is an isometric view of a disc-shaped cantilever spring.
Figure 9:
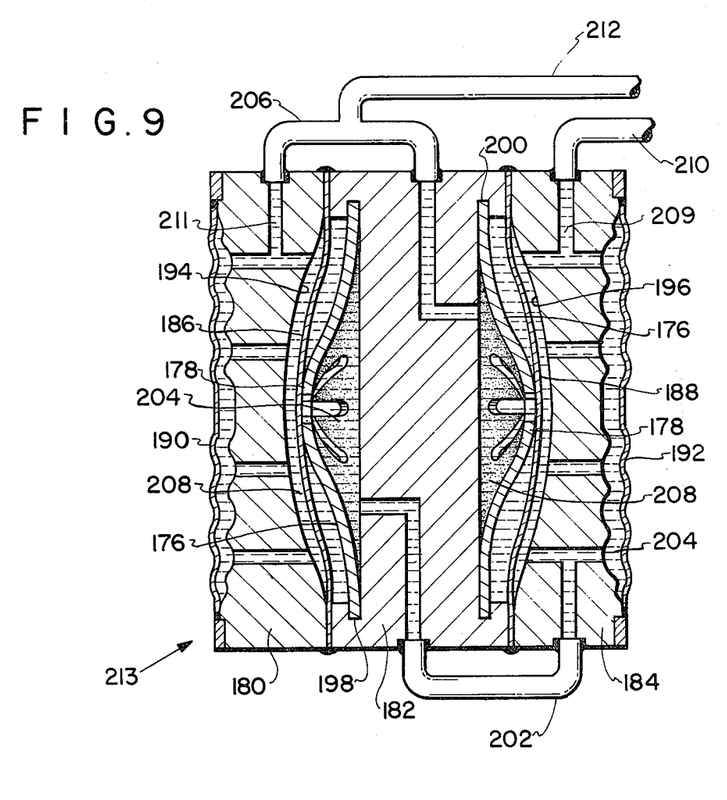
FIG. 9 is a sectional view of another modified form of the sensing head employing two of the springs of FIG. 8.

FIG. 8 shows an isometric view of a disc-shaped cantilever spring 176 having a number of similar spring fingers 178 for use in another modified form of the invention shown in FIG. 9. The form of the invention shown in FIG. 9 employs three blocks 180, 182, 184, two center diaphragms 186, 188, and two barrier diaphragms 190, 192. These parts are welded together in the same fluid-tight manner as the center diaphragms 142, 144 and the barrier diaphragms 158, 160 are welded to their respective blocks 136, 138, 140 shown in FIG. 7.

The inner walls of the blocks 180, 184 each have a smooth dished-out surface 194, 196. The block 182 has two annular grooves 198, 200 into which the outer periphery of a disc-shaped cantilever spring 176 of FIG. 8 is inserted. Each of the cantilever springs 176, 176 is positioned within the block 182 so that its respective spring fingers 178 can apply a preloading spring force to a different one of the flat center diaphragms 186, 188.

A number of passageways, for example 202, are employed to apply the pressure of a first non-compressible fill liquid 204, acting on the low pressure side of the pressure sensing head shown in FIG. 9, to one side of each of the center diaphragms 186, 188. Another number of passageways, for example 206, are employed to apply the pressure of a second non-compressible fill liquid 208, acting on the high pressure side of the pressure sensing head shown in FIG. 9, to the other side of each of the center diaphragms 186, 188. A pair of passageways 209, 211 connects the capillary tubes 210, 212, respectively, to the fill liquids 204, 208 in blocks 184, 180.

Capillary tubes 210, 212, each containing a separate one of the fill liquids 204, 208, are also provided for transmitting pressure changes occurring in these fill fluids to a remote sensor capsule 14, as shown in FIG. 1.

FIG. 9 shows the blocks 180, 182, 184 and their associated diaphragms 190, 186, 188 and 192 joined together by TIG seam welds in a manner similar to that previously set forth under the description of FIG. 7. The block and diaphragm arrangement shown in FIG. 9 thus provides an integral or one piece welded pressure sensing head 213.

A dished out chamber, not shown, is mounted on each of the opposite sides of the pressure head 213 to enable a high pressure process fluid to be applied to the barrier diaphragm 190 and a low pressure process fluid to be applied to the barrier diaphragm 192, in a manner similar to the arrangement of the head chambers 62, 64 as set forth under the description of FIG. 2.

Figure 10:
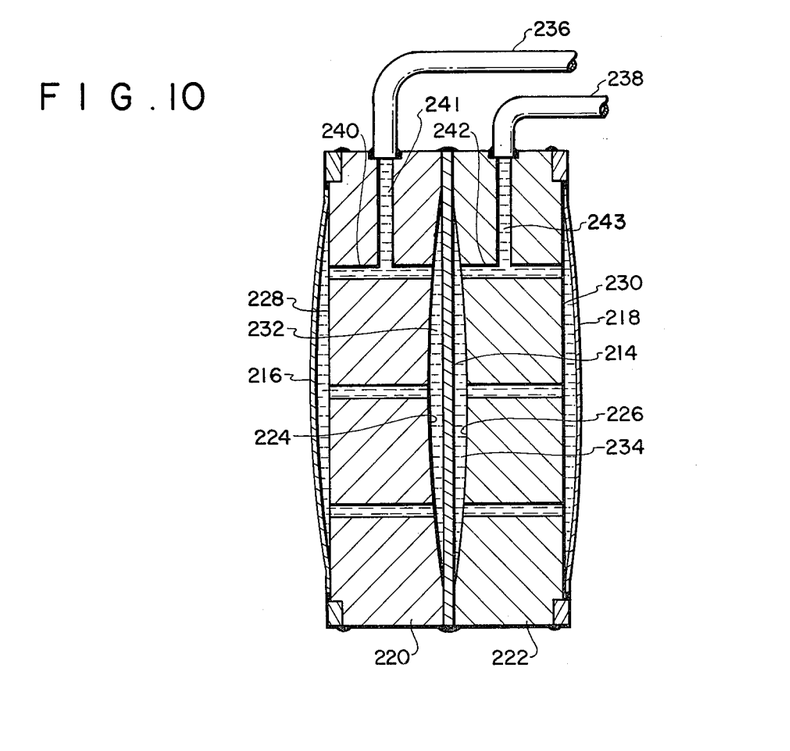
FIG. 10 is a sectional view of still another modified form of the sensing head shown in FIG. 2.

FIG. 10 shows still another modified form of head structure that differs from the embodiment as shown in FIG. 2 in that it has a relatively stiff center or control diaphragm 214 and two barrier diaphragms 216, 218 made of thin, flexible flat plates rather than being convoluted as in FIG. 2. Another difference is that each of the blocks 220, 222 has a smooth dished-out, or concave, inner surface 224 and 226, respectively, and has outer flat surfaces 228, 230 instead of convoluted surfaces as in FIG. 2. A series of passageways 240 and 241 and chambers provides a fluid connection between the inner surface of diaphragm 216 and one side of center diaphragm 214 and a capillary tube 236. Similarly, a series of passageways 242, 243 provides a fluid connection between the inner surface of diaphragm 218 and one side of center diaphragm 214 and a capillary tube 238.

First and second fill liquids 232, 234 are under pressure and fill the respective passageways, chambers and capillary tubes. This arrangement differs from the arrangement of FIG. 2 in that the pressure of the fill liquids 232, 234 is selected to bow the barrier diaphragms 216, 218 outwardly into a non-buckling spherical, dome-shaped or cup-shaped position as shown in FIG. 10. All of the other parts of the pressure head not shown in FIG. 10, including the addition of dished-out head portions, 62, 64, may be the same as those shown in FIG. 2.

The stiffness of the control or compliance diaphragm 214 should be on the order of one hundred times greater than the stiffness of the barrier diaphragms 216, 218. The stiffness of the control or compliance diaphragm 34 of FIG. 2, on the other hand, should be about forty times greater than the stiffness of its associated barrier diaphragms 46, 48.

MODE OF OPERATION

The pressure of a process fluid 82 on the high pressure side of an orifice in a flow line, not shown, is applied by way of passageway 78 to the head chamber 62 and against the barrier diaphragm 46. When a pressure change in this high pressure fluid occurs, it is applied by the barrier diaphragm 46 and the fill liquid 88 against one side of the center diaphragm 34, and by way of the capillary tube 16 to one side of the sensor 102 shown in FIG. 3.

The pressure of the process fluid 84 that is simultaneously present on the low pressure side of the aforementioned orifice is applied by way of passageway 80 to the head chamber 64 and against the barrier diaphragm 48. When a pressure change in this low pressure fluid occurs, it is applied by barrier diaphragm 48 and the fill liquid 89 against an opposite side of the center diaphragm 34, and by way of capillary tube 18 to an opposite side of the sensor 102 shown in FIG. 3.

When an increase in the temperature of the process fluid occurs, there is a tendency for additional heat to be transmitted from this fluid by way of the barrier diaphragms 46, 48 to the fill fluids 88, 89. This increase in temperature of the fill liquids 88, 89 causes the barrier diaphragm 46 to expand outwardly in a right to left direction, and the barrier diaphragm 48 to simultaneously expand outwardly in a left to right direction. As this increase in temperature takes place, the fill liquid 88 will apply the same increase in pressure to one side of the center diaphragm 34 as the fill fluid 89 applies to the opposite side of the diaphragm 34. The position of the center diaphragm is therefore not affected by a change in temperature of the process fluid. No unbalanced pressure change will therefore take place in the fill fluids 88, 89, that are acting on the opposite sides of the sensor 102, when an increase in the temperature of the fluid occurs. The present invention thus provides a reliable sensor to accurately convert a high-low differential pressure of a process fluid into a proportional electric signal even when the process fluid under measurement is a hot liquid whose temperature is constant or varying from one temperature level to another.

Another feature of the present invention is that the sensor 102 is positioned at a remote location from the pressure head 12 rather than being positioned within the pressure head and in a fluid fill that is adjacent a barrier diaphragm from which heat and/or pulses from the process fluid may be emitted. With the present invention, the heat and pulses which each of the fill liquids 88, 89 receives from its associated hot process fluid are substantially dissipated through the length of capilliary tubing 16, 18, which tubing may well be 3 or more inches long, and may be exposed to the effect of a cooling atmosphere. Thus, the transmission of sensor-damaging heat and/or pulses from the process fluids to the sensor by way of the fill liquids is minimized.

Also, since this remote sensor construction does not place the sensor within the pressure sensing head, there is no need to bring the sensor electrical conductors or output leads from inside the head to the exterior thereof. This makes it unnecessary to provide the temperature-resisting lead seals which are required when the sensor is located within the head.

Moreover, the disclosed remote sensor construction provides several additional practical advantages. Specifically, it permits either the pressure head or the sensor capsule to be replaced in an installation without affecting the other of these parts. It prevents the sensor from being damaged during the welding and other head fabrication processes. It simplifies the design of the head. Finally, it permits the sensor capsule to be filled with the full fluid as soon as the capsule is constructed, thereby facilitating the testing of the sensor, and maintaining its characteristics in a stable condition.

The center diaphragm 34 is of a predetermined stiffness sufficient to allow an overloading or excessive process fluid pressure, acting on either the high or low pressure barrier diaphragm 46, 48, to force that overloaded diaphragm into bottomed-out engagement with its associated convoluted surface 42 or 44, without bottoming-out of the central diaphragm 34. This prevents an overload process fluid pressure, acting on either the low or high pressure side of the pressure head 12, from being applied by way of the fill fluids 88, 89 to the sensor 102, and degrading or rupturing the sensor.

The aforementioned bottoming-out action will take place without the center diaphragm 34 bottoming-out on either the convoluted surface 30 of block 26 or the convoluted surface 32 of block 28. This is made possible because the volume of fluid 88, 89 that is displaced by either one of the barrier diaphragms 46, 48, during an overload which seats it against its associated wall 42, 44, will be less than the resulting change in volume of the fluid that must be displaced in chambers 36 or 38 before the center diaphragm 34 would be allowed to be seated against the walls 32 or 30.

The diaphragms 46, 34 and 48 are sized for each particular operating range of the transmitter so that the aforementioned bottoming-out action can occur only after full scale pressure has been exceeded. This is accomplished by selecting a prescribed stiffness for the center diaphragm 34 to suit the selected range, and by selecting two matched flexible barrier diaphragms 46, 48.

Pins 20, connected to the bridge 114 of the sensor 102, are shown plugged into sockets 21 of the board 22 that is located in the housing 24. This construction provides an easy, reliable way of connecting the leads of the bridge 114 to the circuit board 22.

The version of the invention shown in FIG. 7 has a high pressure overload diaphragm 144, each of which is pre-loaded in a direction toward its associated barrier diaphragm 158; 160. Pre-loading or prestressing of the control diaphragms 142, 144 to a desired prestressed condition is obtained by TIG welding the control diaphragms to center section 138 and then clamping sections 138, 140 and 136 together and TIG welding them. The pre-load is selected so that the barrier diaphragms 158, 160 will transmit the differential pressure to the remote sensor 102 in a manner as previously described. Neither the high pressure nor the low pressure center diaphragms 142, 144 move until the differential pressure value surpasses the aforementioned full scale range of the transmitter 10. When the full scale range of the transmitter is passed, either the high pressure or low pressure center control diaphragm 142, 144 starts to move, and this action allows the barrier diaphragm 158 to bottom-out on block surface 159, or barrier diaphragm 160 to bottom-out on block surface 161. The main advantage of this construction is that the entire full scale differential pressure signal is transmitted to the sensor 102 with an infinitesimally small amount of barrier diaphragm motion.

This pre-loading, or prestressing, is done so that, during the operation of the transmitter, a pressure slightly greater that its full scale differential pressure will be required in order to balance the preload and start the center control diaphragm 142 or 144 moving inward.

FIG. 9 shows another modified form of the invention in which flat control diaphragms are pre-loaded by disc-shaped cantilever springs 176, 176. In this arrangement, the high pressure and low pressure overload control diaphragms 186, 188 can be of a stiffness similar to that of the barrier diaphragms 190, 192 because the cantilever springs 176, 176 provide the calibrated stiffness for the overload protection of the sensor 102. The springs 176, 176 are made of three sizes, namely, one for the 1,000 inch range transmitter, one for the 250 inch range transmitter, and one for the three lower transmitter ranges, namely, the 105, 40 and 15 inch ranges. The high pressure and low pressure overload control diaphragms 186, 188 are cross connected by passageways 202, 206 to the fill volumes so that they will sense the true differential pressure across the transmitter.

The version of the invention shown in FIG. 10 uses flat diaphragms 216, 218 for the barrier diaphragms and a flat diaphragm 214 for the control diaphragm. The high pressure and low pressure fills 232, 234 are kept at a volume to retain the barrier diaphragms 216, 218 in a dome or spherical shaped operating position. The substantially flat center diaphragm is stiffer than the dome-shaped barrier diaphragms so that the barrier diaphragms will not bottom-out until the differential pressure has surpassed the full scale value. When full scale has been surpassed, the center diaphragm 214 continues to move until the barrier diaphragm 216 or 218 bottoms on its back plate. After either the barrier diaphragms 216, 218 has bottomed-out, the diaphragm 214 has room for additional movement in the event of thermal expansion of the fill fluid 232, 234. Three center diaphragms, each having a different stiffness, are used for the above-noted differential pressure ranges, namely, one for the 1,000 inch range, one for the 250 inch range, and a third to cover the 105 inch, 40 inch, and 15 inch ranges.

The barrier diaphragms 158, 160 of FIG. 7; 190, 192 of FIG. 9; and 216, 218 of FIG. 10 are generally made of stainless steel AISI type 316. When the chemical corrision nature of the process fluid under measurement is extremely high, the aforementioned barrier diaphragms are made of other material, such as Hastalloy, Monel or tantalum. These latter materials have greater resistance to chemical corrosion than stainless steel. The center diaphragms 142, 144 of FIG. 7; 186, 188 of FIG. 9; and center diaphragm 214 of FIG. 10 are preferably made of stainless steel AISI type 316.

It is noted that the transmittters illustrated herein have been illustrated, by way of example, as being of the type in which each of the two applied pressures, whose differential is to be sensed, acts on the sensor by way of a corresponding barrier diaphragm, fill fluid, and capillary tube. It is noted further, however, that the disclosed control diaphragm means and capillary means for protecting the sensor from excessive pressure, heat, and/or pulses are equally effective in transmittters wherein the differential pressure to be sensed is the difference between one pressure which acts on one side of the sensor by way of a barrier diaphragm, fill fluid, and capillary tube, and an atmospheric or a fixed pressure which acts on the other side of the sensor. That is, said sensor protecting means according to the present invention are equally effective where the two applied pressures are one process pressure and an atmospheric or a fixed pressure, and where only a single barrier diaphragm, fill fluid and capillary tube are therefore required and utilized. Thus, when the wafer 102 senses the difference between an atmospheric pressure or a fixed pressure and a process pressure transmitted to the wafer by a single barrier diaphragm, fill fluid, and capillary tube, the control diaphragm 34, etc., operates in the same manner as that described above to protect the sensor from excessive pressure. Likewise, the capillary tube which transmits the single process pressure to one side of the sensor operates in the same manner as that described above to minimize the transfer of heat and/or pulses from the process fluid to the sensor.

It is further noted that, although the control diaphragm means and the capillary means cooperate to protect the sensor in the illustrated embodiment of the present invention, either of these means can be used individually to protect the sensor according to the present invention in those cases wherein the protection afforded by the other of the means is not required or desired.

In summary, there has been provided, in accordance with the present invention, improved differential pressure to electrical signal transmitter structure which embodies a relatively simple and compact arrangement for preventing excessive pressures from being applied across a differential pressure sensing element of the minute displacement type. The improved structure according to the invention also embodies a construction which effectively isolates the sensing element from damaging heat and/or pulsations that are present in the process fluid applied to the head portion of the transmitter, and which avoids the need for relatively costly seals at the points where the sensing element leads leave the transmitter.

The embodiments of the invention in which an exclusive property or privilege is claimed are defined as follows:

1. A differential pressure to electrical signal transmitter comprising a head structure having a plurality of surfaces, a first barrier diaphragm mounted in spaced and sealed relationship to a first one of said surfaces to form a first fluid chamber between one face of said first diaphragm and said first surface, a second barrier diaphragm mounted in spaced and sealed relationship to a second one of said surfaces to form a second fluid chamber between one face of said second diaphragm and said second surface, means for applying a first force to the other face of said first diaphragm which is representative of a first fluid pressure and which urges said first diaphragm toward said first surface, means for applying a second force to the other face of said second diaphragm which is representative of a second fluid pressure and which urges said second diaphragm toward said second surface, control diaphragm means mounted in spaced and sealed relationship to third and fourth ones of said surfaces to form a third fluid chamber between one face of said diaphragm means and said third surface, and to form a fourth fluid chamber between another face of said diaphragm means and said fourth surface, differential pressure sensor means located at a position remote from said head structure and including a sensing element having first and second element portions and an electrical output connection and operative to produce in said output connection a signal representative of the difference between the pressures of two fluids acting, respectively, on said first and second element portions, said element experiencing only a minute displacement as said pressure difference traverses its normal operating range, first passage means interconnecting said first chamber and said third chamber, second passage means interconnecting said second chamber and said fourth chamber, a first length of capillary tubing extending between said head structure and said sensor means and constituting a fluid connection between said first element portion and said first and third chambers, a first substantially incompressible fill fluid completely filling said first and third chambers, said first passage means, and said first length of capillary tubing and acting on said first element portion by way of said first length of capillary tubing, a second length of capillary tubing extending between said head structure and said sensor means and constituting a fluid connection between said second element portion and said second and fourth chambers, and a second substantially incompressible fill fluid completely filling said second and fourth chambers, said second passage means, and said second length of capillary tubing and acting on said second element portion by way of said second length of capillary tubing, the dimensions of said first and second lengths of capillary tubing being such as to minimize the transfer of sensor-damaging heat and pulses through said fill fluids from said head structure to said element, the relative stiffness of said diaphragm means and said barrier diaphragms being made such that an excessive value of either of said first and second fluid pressures causes the corresponding one of said barrier diaphragms to bottom-out on the corresponding one of said first and second surfaces, and causes said diaphragm means to deflect away from the corresponding one of said third and fourth surfaces, thereby preventing said pressure difference on said element from exceeding said normal operating range and adversely displacing said element, wherein said control diaphragm means consists of first and second control diaphragms, said one face of said diaphragm means is one face of said first control diaphragm, said another face of said diaphragm means is one face of said second control diaphragm, said head structure has fifth and sixth surfaces, said first control diaphragm is mounted in spaced and sealed relationship to said fifth surface to form a fifth fluid chamber between the other face of said first control diaphragm and said fifth surface, said second control diaphragm is mounted in spaced and sealed relationship to said sixth surface to form a sixth fluid chamber between the other face of said second control diaphragm and said sixth surface, said first passage means includes an interconnection to said sixth chamber, said second passage means includes an interconnection to said fifth chamber, said first fill fluid completely fills said sixth chamber, and said second fill fluid completely fills said fifth chamber.

2. Apparatus as specified in claim 1, wherein said head includes first and second substantially identical outer block members and a central block member, said first block member has a first face forming said first surface and has a second, opposite face forming said third surface, said second block member has a first face forming said second surface and has a second, opposite face forming said fourth surface, said central block member has first and second, opposite faces forming said fifth and sixth surfaces, respectively, and said block members are secured together to place said second face of said first block member and one of said faces of said central block member in abutting relation, with said first control diaphragm secured at its periphery between the last-mentioned two faces, and to place said second face of said second block member and the other of said faces of said central block member in abutting relation, with said second control diaphragm secured at its periphery between the last-mentioned two faces.

3. Apparatus as specified in claim 2, wherein said second faces of said first and second block members are convex, and said faces of said central block member are concave.

4. Apparatus as specified in claim 2, wherein said second faces of said first and second block members are concave, and each of said faces of said central block member contains a recess.

5. Apparatus as specified in claim 1, wherein a first preloading spring means is positioned in said fifth chamber to urge said first control diaphragm toward said third surface, and
a second preloading spring means is positioned in said sixth chamber to urge said second control diaphragm toward said fourth surface.

* * * * *